United States Patent [19]

Rhoades

[11] 4,372,142
[45] Feb. 8, 1983

[54] SHEET BENDING BRAKE

[75] Inventor: James J. Rhoades, Garden City, Mich.

[73] Assignee: Tapco Products Company, Inc., Detroit, Mich.

[21] Appl. No.: 211,463

[22] Filed: Nov. 28, 1980

[51] Int. Cl.³ .................... B21D 5/04; B21D 11/04
[52] U.S. Cl. .................. 72/319; 267/36 A; 269/239; 269/254 R
[58] Field of Search .................. 72/319-323, 72/297; 269/254 R, 239; 267/42, 36 A

[56] References Cited

U.S. PATENT DOCUMENTS

| | | | |
|---|---|---|---|
| 124,863 | 3/1872 | Sugden et al. | 72/320 |
| 759,507 | 5/1904 | Ericson et al. | 267/42 |
| 1,112,192 | 9/1914 | Callan | 269/254 R |
| 1,153,058 | 9/1915 | Gilfillan | 267/42 |
| 2,321,854 | 6/1943 | Rabezzana et al. | 72/319 |
| 3,481,174 | 12/1969 | Barnack | 72/319 |
| 3,482,427 | 12/1969 | Barnack | 72/319 |
| 3,663,048 | 5/1972 | Zimmerle | 267/42 |
| 4,237,716 | 12/1980 | Onisko | 72/319 |
| 4,321,817 | 3/1982 | Barnack | 72/319 |

Primary Examiner—Daniel C. Crane
Attorney, Agent, or Firm—Barnes, Kisselle, Raisch & Choate

[57] ABSTRACT

A sheet bending brake comprising a frame having a fixed jaw and a movable jaw and an anvil member adjustable secured to the movable jaw. The fixed jaw has a clamping surface movable between workpiece clamping and non-clamping positions relative to the clamping surface of the fixed jaw. A bending member is hingedly connected to the fixed jaw. The movable jaw is releasably locked in workpiece clamping position by a structure that includes an oval shaped spring device member having opposed ends and opposed walls. The spring device is pivoted at one end to said movable jaw and at the other end to a handle for manipulating the jaw and comprises a pair of links each of which comprises front and rear walls. The front walls are pivoted to one another and a wedge is positioned between the rear walls so that as the thickness of workpiece varies the spring device will pivot to accommodate the different thickness.

12 Claims, 10 Drawing Figures

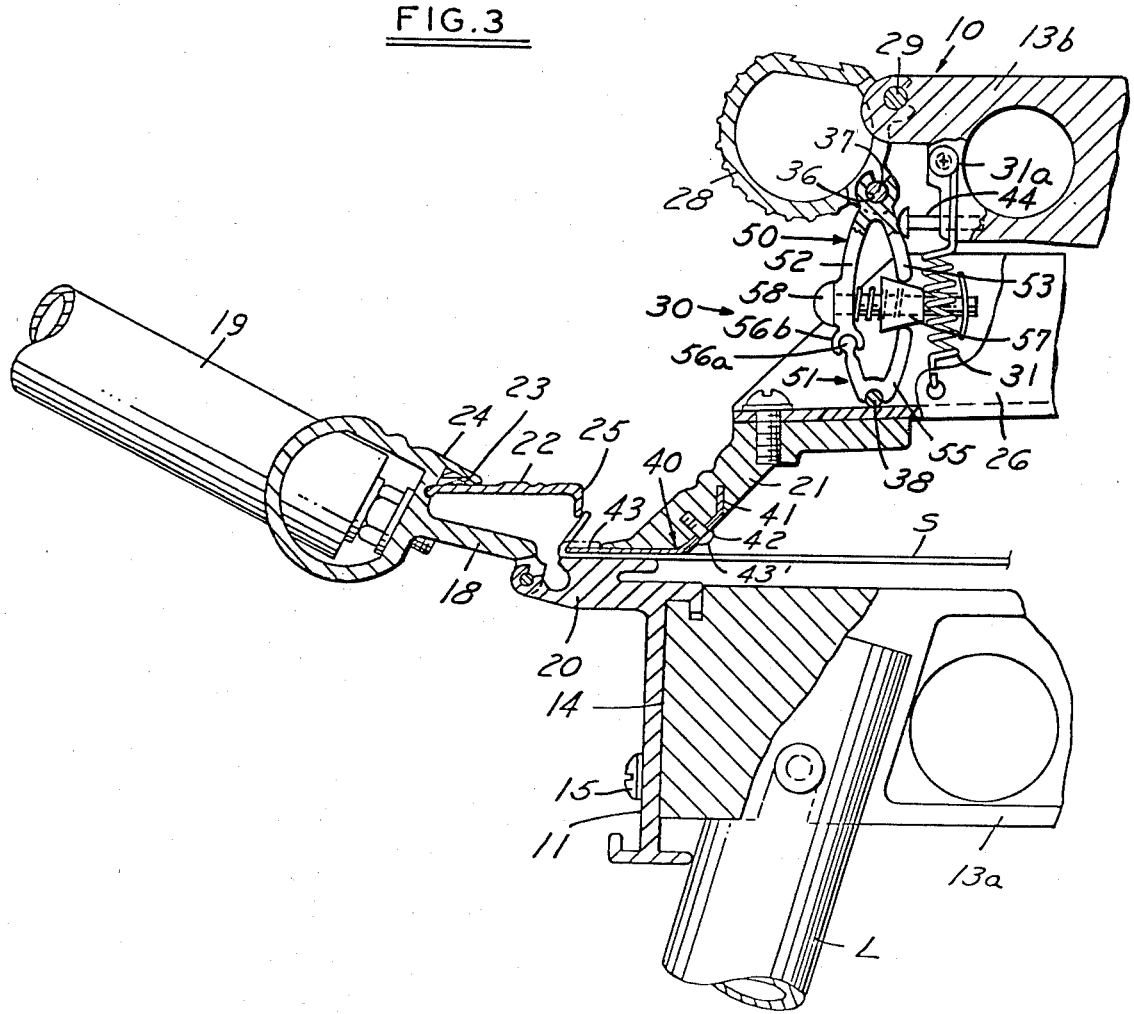

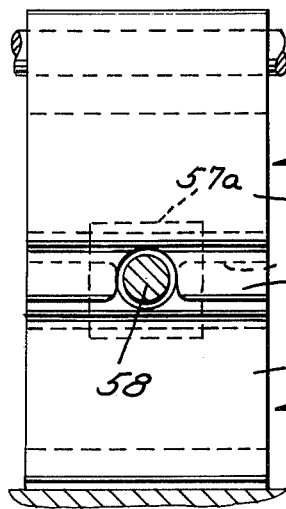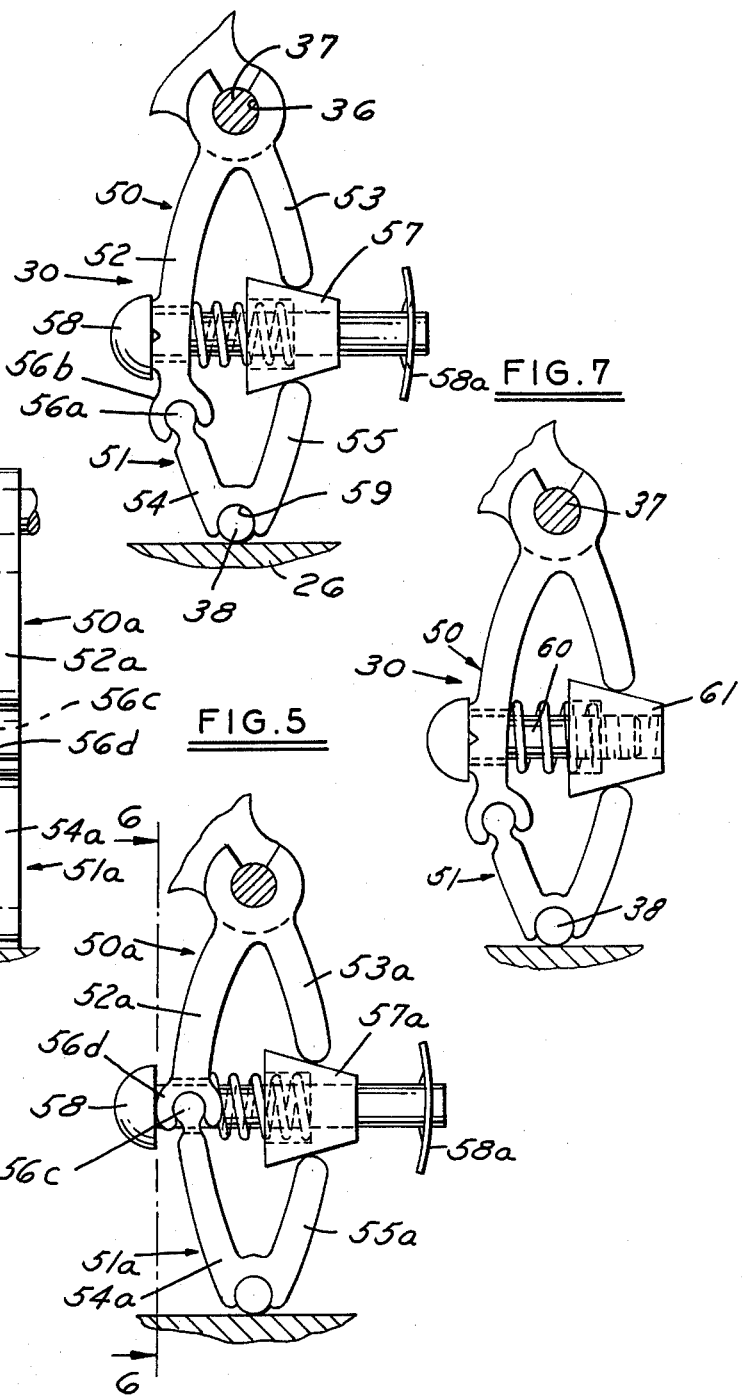

SHEET BENDING BRAKE

This invention relates to sheet bending brakes.

BACKGROUND AND SUMMARY OF THE INVENTION

In U.S. Pat. Nos. 3,161,223, 3,481,174, 3,482,427, 3,559,444, 3,817,075 and 3,872,755, there are disclosed sheet bending brakes for bending metal or plastic sheets as are used in siding on homes and buildings.

In my U.S. application Ser. No. 141,427 filed Apr. 18, 1980 there is disclosed a sheet metal brake comprising a frame having a fixed jaw and a movable jaw and an anvil member adjustable secured to the movable jaw. The fixed jaw has a clamping surface movable between workpiece clamping and non-clamping positions relative to the clamping surface on the fixed jaw. A bending member is hingedly connected to the fixed jaw. The movable jaw is releasably locked in workpiece clamping position by a structure that includes an oval shaped spring member having opposed ends and opposed walls. The member is pivoted at one end to the movable jaw and at the other end to a handle for manipulating the jaw.

Among the objects of the present invention are to provide a sheet bending brake of the aforementioned type wherein the spring force for clamping the workpiece can readily be adjusted to accommodate variations in thickness of the sheet to be bent.

In accordance with the invention, the generally oval shaped spring device is made of two members, each of which has front and rear walls with the front walls pivoted to one another to vary the force between the front and rear walls and the pivotal relationship of the two members thereby accommodating the sheet bending brake to workpiece of differing and varying thicknesses.

DESCRIPTION OF THE DRAWINGS

FIG. 3 is a fragmentary part sectional view similar to FIG. 1 on an enlarged scale showing the parts in a different operative position.

FIG. 4 is a fragmentary view on an enlarged scale of a portion of the sheet bending brake.

FIG. 5 is a fragmentary view of a portion of a modified sheet bending brake.

FIG. 6 is a fragmentary sectional view taken along the line 6—6 in FIG. 5.

FIG. 7 is a fragmentary view similar to FIG. 4 of a modified form of the invention.

DESCRIPTION

Figure 1:
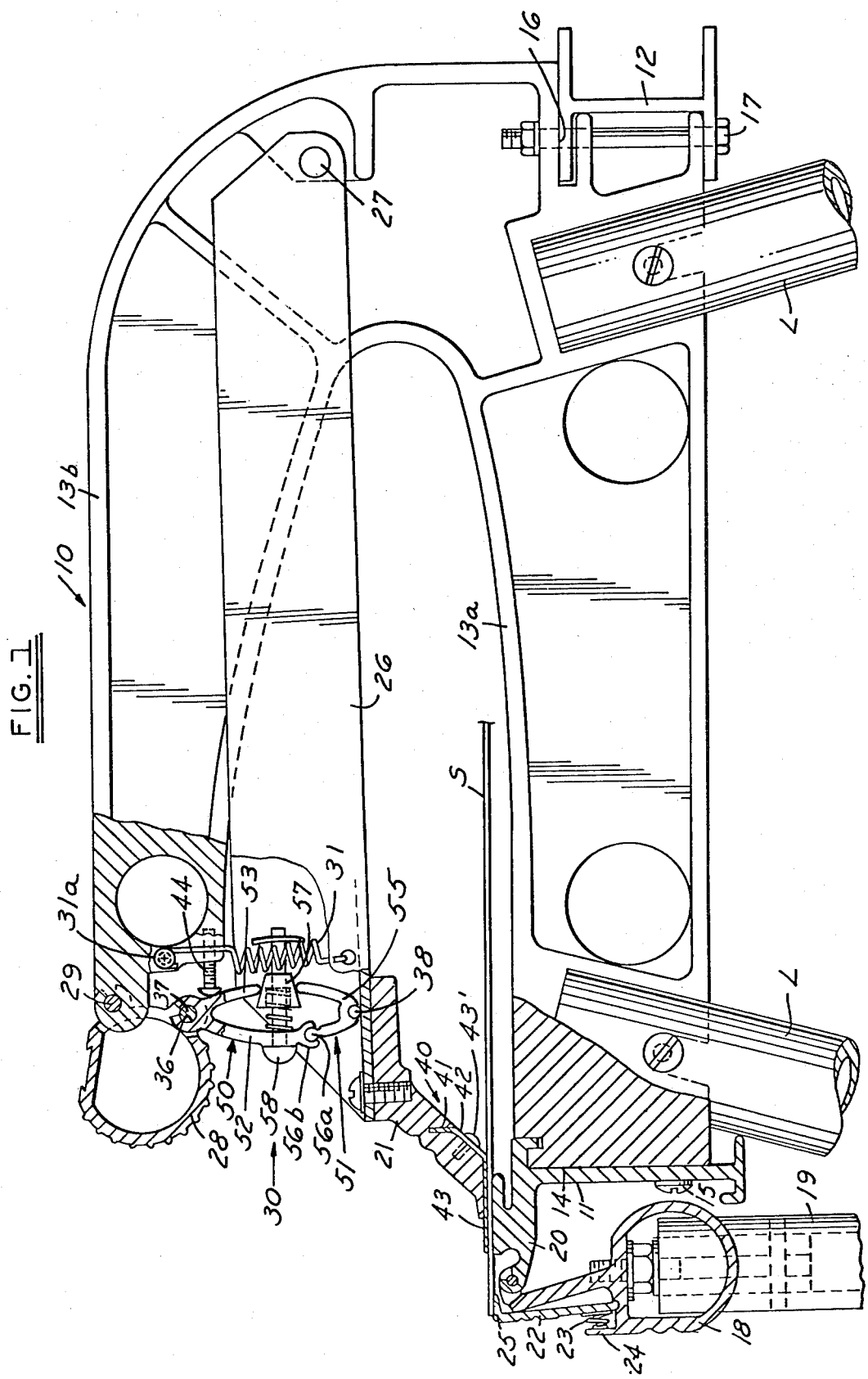
FIG. 1 is a fragmentary part sectional side elevational view of a sheet bending brake embodying the invention.
Figure 2:
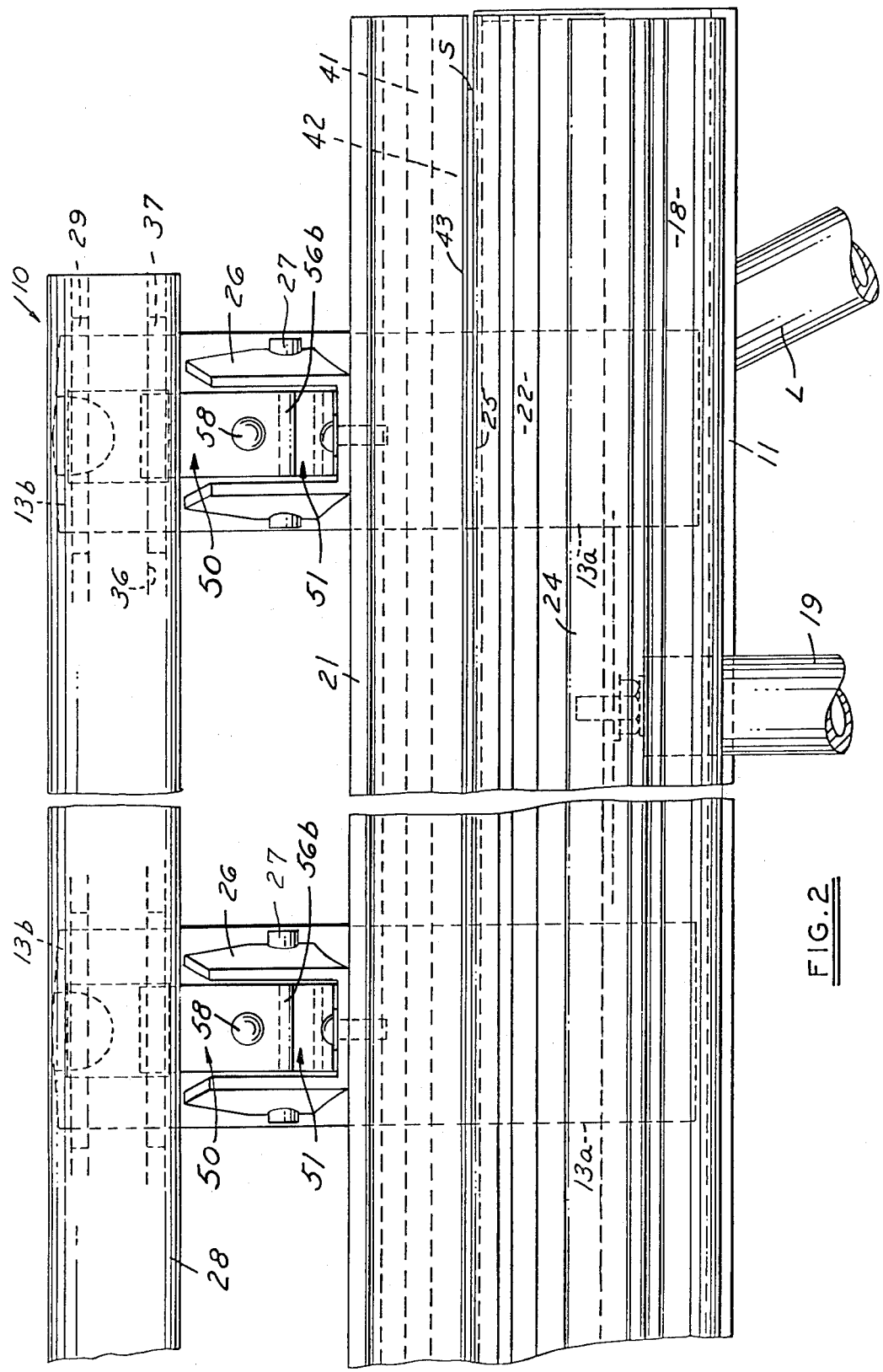
FIG. 2 is a fragmentary front elevational view of the same.

The brake embodying the invention comprises longitudinally spaced C-shaped frame members 10 connected by a front rail 11 and a rear rail 12. Each frame member 10 includes a lower arm 13a which is designed to define a front side face recess 14 to which rail 11 is bolted as by bolts 15 and a rear side face recess 16 to which I-shaped rail 12 is bolted as by bolts 17. Each C-frame member 10 also includes an upper arm 13b which overlies the lower arm 13a in spaced relation thereto. Tubular legs L extend into integral sockets in some of frames 10 to support the brake above the floor. A bending member 18 in the form of an aluminum extrusion is hinged to front rail 11 and one or more bending bar handle members 19 are fixed to the bending bar 18 for facilitating movement thereto. The upper portion 20 of front rail 11 is formed with a flat clamping surface.

Portion 20 and bending member 18 are formed with mating integral projections along their longitudinal edges, which projections are provided with openings coaxially aligned with the projections are intermeshed and a pin extends through the openings to complete the hinge between bending member 18 and portion 20.

An anvil member 21 is provided in overlying relation to the upper planar surface of portion 20.

A generally L-shaped floating hinge compensator 22 is provided in overlying relation to the upper planar surface of bending member 18 and is pivotally secured thereto by engagement with a groove in bending member 18. Springs 23 are interposed between a lip 24 and compensator 22.

Hinge compensator 22 is provided along its opposite or outermost longitudinal edge with a foot portion 25 which normally overlies and rests against the outwardly facing surface defined by the hinge connection between the bending member 18 and the portion 20.

As shown in FIG. 1, when the bending member 18 is out of bending position, the foot portion 25 of the hinge compensator 22 overlies the hinge connection and is disposed in a horizontal plane below that of the anvil member 21.

As the bending member 18 is swung upwardly from the position shown in FIG. 1 to the position shown in FIG. 3, the compensator 22 pivots with foot portion 25 thereof riding upwardly relative to the lower planar surface of the workpiece, which is clamped relative to the anvil 21 by a clamping sub-assembly presently described.

When the workpiece has been bent to the desired angular shape, the bending member 18 is swung downwardly whereupon the foot portion 25 of the compensator 22 rides downwardly to return to its normal position wherein it overlies the hinge connection. The compensator 22 thus serves to tend to minimize marring of the sheet and provide a continuous bending pressure.

The clamping sub-assembly includes a channel-shaped pivot bar 26 on each frame 10 on which anvil 21 is fixed. Bar 26 is pivoted at its opposite innermost end to upper arm 13b of each C-frame 10 as by a pivot pin 27.

A handle member 28 is pivoted along one of its edges by a pivot pin 29 to the forward end of upper arm 13b of each C-frame 10 and is pivotally connected to pivot bar 26 by a spring device 30 pivoted at its upper end to an edge of the handle member and at its lower end to the pivot bar 26.

A tension spring 31 is connected at one end to upper arm 13b by a screw 31a and at its opposite end to pivot bar 26 to yieldingly urge each bar 26 upwardly.

In accordance with the invention, spring device 30 is articulated and made of an upper link 50 and a lower link 51 (FIG. 4). Each link 50, 51 is generally U-shaped so that the shape of the assembled spring device is generally oval shaped. The upper link 50 includes a front wall 52 and a rear wall 53. The lower link 51 includes a front wall 54 and a rear wall 55. The upper end of the front wall 54 of the lower link 51 is formed with an enlargement or bead 56a that extends into a recess 56b in the front wall 52 of the upper link 50 so that the two links 50, 51 can pivot relative to one another. The links 50, 51 are preferably made as aluminum extrusions and the U-shaped recess 56b and enlargement 56a are dimensioned such that the links are assembled by sliding enlargement 56a laterally into recess 56.

The front wall 52 of upper link 50 is longer than the rear wall 53 while the front wall 54 of the lower link 51 is shorter than the rear wall 55.

The rear walls 53, 54 of the links leave free edges spaced from one another and a wedge 57 extends into the space and a headed pin 58 extends through front wall 52 and through an opening in the wedge 57.

A fastener 58a on the end of pin 58 prevents the loss of the wedge pin.

Spring device 30 is formed with an opening 36 at its upper end through which a pin 37 is positioned and extends into an opening in handle member 28 to pivot spring member 30 to the handle member 28. A dowel pin 38 engages a recess 59 in the lower link 51 at the juncture of walls 54, 55 and engages the base of bar 26 to pivot the spring member 30 to bar 26.

Manipulation of handle member 28 clockwise as viewed in FIG. 1 forces anvil 21 downwardly to clamp a sheet S to be bent on portion 20. During this movement, the spring member 30 is moved so that its pivot passes under pivot 29 applying a resilient clamping force on an anvil 21. A bolt 44 is adjustably threaded horizontal into the upper arm forming an adjustable stop which is engaged by spring member 30 to control the locked position of the spring member 30.

Anvil 21 has its forward edge spaced rearwardly of the forward edge portion 20 when the anvil 21 is in clamping position. An extension member 40 is mounted on the anvil 21. Extension member 40 is made of uniformly thick material and comprises a first portion 41 received in a vertical slot in the inner surface of anvil 21, a second portion 42 extending along the inclined inner surface of anvil 21 and a horizontal portion 43 extending along the bottom surface of anvil 21 to define a free bending edge. Fasteners 43', extend through second portion 42 at longitudinally spaced points and are threaded into the anvil 21.

In use, a sheet S is properly positioned relative to lower arm 13a so that it rests upon portion 20 and foot portion 25 of hinge compensator 22. Handle member 28 is then swung downwardly to bring the clamping surface of extension member 40 into contact with the upper planar surface of the sheet S and the handle member 28 is rotated to swing spring member 30 past center, thereby locking the anvil on the sheet S.

Bending bar handle member 19 is now swung upwardly to cause the foot portion 25 of the compensator 22 to pivot outwardly relative to bending member 18 thereby causing the workpiece to bend along the forward edges of the extension member.

Since the horizontal portion 43 of extension member 40 extends beyond the forward edge of anvil 21 and the area above the portion which extends beyond the anvil 21 is unobstructed, the bending member 18 can be swung substantially beyond ninety degrees producing a bend substantially greater than ninety degrees up to substantially 180° (FIG. 3). However with usual spring- back of the sheet an angle of about 165°-170° can be achieved.

When the sheet S has been bent to the desired angle, the handle member is swung downwardly and the compensator 22 returns to its rest position.

In the form of the invention shown in FIGS. 5 and 6, the spring device 30a is constructed that the recess 56d of the upper link 50a and the enlargement 56c of the lower link 51a are positioned such that the screw 58a extends through slots 60 in the recess 56d and enlargement 56c. As a result the pivotal axis of the links 50a, 51a relative to one another intersects the axis of the screw 58.

In the form of the invention set forth in FIG. 7, the pin 58 is replaced by a screw 60 threaded into wedge 61. Threading screw 60 inwardly and outwardly not only varies the spring force between the walls 52, 53 of the upper link 50 and the walls 54, 55 of the lower link 51 but also changes the angular relationship of the upper link 50 to the lower link 51 so that the clamping force on the workpiece can be readily varied not only to accommodate workpieces of different thicknesses but also variations in hardness of workpieces having the same nominal thickness. This arrangement provides a more limited accommodation of varying thicknesses.

Figure 8:
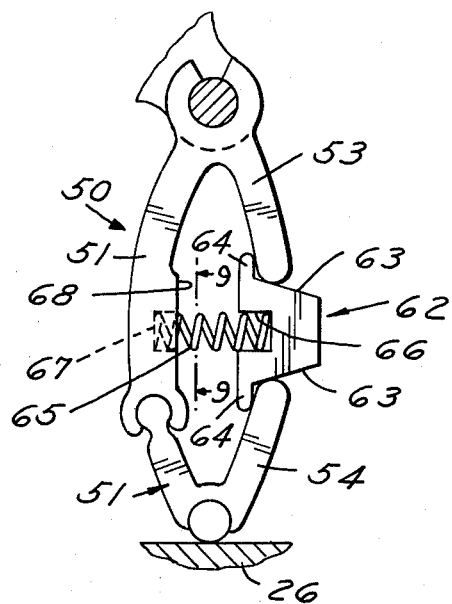
FIG. 8 is a fragmentary sectional view similar to FIG. 4 of a modified form of the sheet bending brake.
Figure 9:
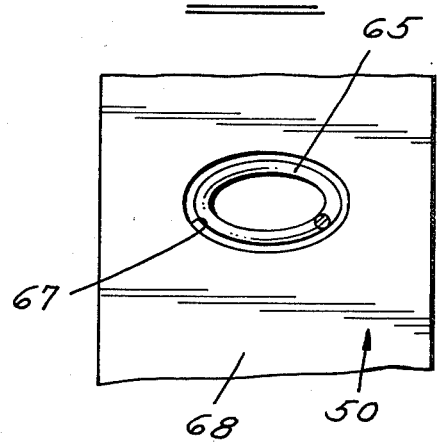
FIG. 9 is a fragmentary sectional view on an enlarged scale taken along the line 9—9 in FIG. 8.
Figure 10:
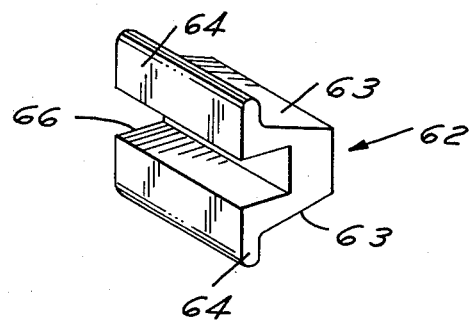
FIG. 10 is a perspective view of a portion of the brake shown in FIG. 8.

In the form of the invention shown in FIGS. 8-10, a modified wedge 62 is utilized which has tapered sides 63, as in the other forms, terminating in laterally extending tabs or walls 64 at the widest point. A compression spring 65 having an oval cross section engages a transverse slot 66 in the base of the wedge and an oval recess 67 in a flattened surface 68 on the upper link 50 so that the wedge 62 is urged between the free ends of the rear walls 53, 54. The slot 66 and recess 67 orient the spring so that its long axis extends transversely of said walls and said wedge. This form of the invention obviates the need for a pin and provides a yielding clamping force to accommodate variations in thickness and hardness of the workpiece being bent.

Alternatively, a compression spring having a round cross section may be provided and a complementary round recess may be provided in the upper link 50. Such an arrangement permits the use of a lower cost round spring and a more easily manufactured round recess. Further, an oval or round recess can be used even though the upper link 50 does not have a flattened surface 68.

I claim:

1. A sheet bending brake comprising
a frame having a fixed jaw and a movable jaw;
an anvil member secured to said fixed jaw;
said movable jaw having a clamping surface movable between workpiece clamping and non-clamping positions relative to the anvil member;
means for releasably locking the movable jaw in workpiece clamping position;
a bending member hingedly connected to the fixed jaw; and
a generally oval shaped spring device comprising generally U-shaped extruded upper and lower links, each link including a front wall and a rear wall connected to one another, each front and rear wall having a free end, the free ends of the front walls of said links extending toward one another and being pivoted to one another and the free ends of the rear walls of said links being spaced from one another, and means extending between at least one front wall and said rear walls for varying the spring force of said spring device, means pivoting the upper link of said spring device at the juncture of the front and rear wall thereof to said means releasably locking said jaw about an axis parallel to the axis about which the front walls are pivoted, means pivoting the lower link of said spring device at the juncture of the front and rear wall thereof to said movable jaw about an axis parallel to the axis about which the front walls are pivoted.

2. The sheet bending brake set forth in claim 1 wherein said means extending between at least one of said front walls and said rear walls comprises a wedge between said free ends of said rear walls of said links and means extending from a front wall and through said wedge.

3. The sheet bending brake set forth in any one of claims 1 or 2 wherein said free ends of said front walls are pivoted to one another by engagement of an enlargement on one front wall in a complementary recess in the other front wall.

4. The sheet bending brake set forth in claim 1 wherein said means pivoting said lower link of said spring device to said movable jaw comprises a pin on said jaw engaging a recess in said lower link at the area of juncture of said front and rear walls.

5. The sheet bending brake set forth in claim 2 wherein said means extending through said wedge comprises a pin and compression spring means interposed between at least one front wall and said wedge.

6. The sheet bending brake set forth in claim 5 wherein said pin extends through said spring means.

7. The sheet bending brake set forth in claim 2 wherein said means extending through said wedge comprises a screw threaded into said wedge.

8. The sheet bending brake set forth in claim 1 wherein said means extending between at least one of said front walls and said rear walls comprises a wedge between said free ends of said rear walls of said links and compression spring means extending between a front wall and said wedge.

9. The sheet bending brake set forth in claim 8 wherein said wedge includes laterally extending projections preventing said wedge from being forced entirely through the space between the free ends of said rear walls.

10. The sheet bending brake set forth in claim 9 wherein said compression spring means comprises a compression spring having an oval cross section.

11. The sheet bending brake set forth in claim 10 wherein said wedge includes an elongated recess receiving one end of said compression spring with its long axis extending transversely of said walls and said wedge.

12. The sheet bending brake set forth in claim 8 including a recess in a front wall of one of said links receiving the end of said spring and means on said wedge for receiving the other end of said spring.

* * * * *